United States Patent [19]

Kersey et al.

[11] Patent Number: 4,932,783
[45] Date of Patent: Jun. 12, 1990

[54] APPARATUS AND METHOD FOR MINIMIZING POLARIZATION-INDUCED SIGNAL FADING IN AN INTERFEROMETRIC FIBER-OPTIC SENSOR USING INPUT-POLARIZATION MODULATION

[75] Inventors: Alan D. Kersey, Springfield, Va.; Michael J. Marrone, Severna Park, Md.

[73] Assignee: United States of America as represented by the Secretary of the Navy, Washington, D.C.

[21] Appl. No.: 383,390

[22] Filed: Jul. 21, 1989

[51] Int. Cl.$^5$ .............................................. G01B 9/02
[52] U.S. Cl. .................................. 356/345; 356/351; 250/227.17
[58] Field of Search .................. 356/345, 351; 250/227

[56] References Cited
U.S. PATENT DOCUMENTS

| 4,597,640 | 7/1986 | Buhrer | 350/405 |
| 4,653,915 | 3/1987 | Frigo et al. | 356/345 |
| 4,729,622 | 3/1988 | Paviath | 350/96.15 |

OTHER PUBLICATIONS

Kersey et al. "Input-Polarisation Scanning Technique for Overcoming Polarisation-Induced Signal Fading in Interferometric Fibre Sensors", reprinted from Electronics Letters, vol. 24, No. 15, Jul. 21, 1988, pp. 931-933.
Kersey et al. "Input Polarisation Effects on Inteferometric Fibre Sensors", Fibre Optics '88, Abstracts of Papers Day 3, 6th International Conference, London 26-28 Apr. 1988.
Kersey et al. "Optimization and Stabilization of Visibility in Interferometric Fiber-Optic Sensors Using Input-Polarization Control", J. of Lightwave Tech., vol. 6, No. 10, Oct. 1988, pp. 1599-1609.
Wanser et al. "Remote Polarization Control for Fiber-Optic Interferometers", Optics Letters, vol. 12, No. 3, Mar. 1987, pp. 217-219.
Kersey et al. "Dependence of Visibility on Input Polarization in Interferometric Fiber-Optic Sensors", Optics Letters, vol. 13, Apr. 1988, pp. 288-290.
Okoshi "Polarization-State Control Schemes for Heterodyne or Homodyne Optical Fiber Communications", J. of Lightwave Technology, vol. LT-3, No. 6, Dec. 1985, pp. 1232-1237.
Ulrich "Polarization Stabilization on Single-Mode Fiber", Appl. Phys. Lett., 35(11), Dec. 1, 1979, pp. 840-842.

Primary Examiner—Vincent P. McGraw
Assistant Examiner—S. A. Turner
Attorney, Agent, or Firm—Thomas E. McDonnell; Peter T. Rutkowski

[57] ABSTRACT

An apparatus for minimizing polarization-induced signal fading in an interferometric fiber-optic sensor is disclosed. The apparatus includes an optical source for providing an input light beam, a polarization modulator for modulating the state of polarization of the input light beam into at least three states represented by mutually perpendicular polarization vectors on a Poincare Sphere. The apparatus further includes means for conveying the input light beam with the at least three mutually perpendicular modulated states of polarization to the fiber-optic sensor, the interferometric fiber-optic sensor being responsive to the input light beam with modulated polarization states for developing an interference pattern output, wherein the interference pattern output has at least three visibilities corresponding to the input states of polarization. A photodetector is responsive to the interference pattern output for developing an electrical signal having at least three amplitudes corresponding to the at least three states of polarization. An output circuit is responsive to the electrical photodetector signal for time-sampling the photodetector signal having three amplitudes corresponding to the at least three mutually perpendicular input states of polarization and selecting the one having maximum visibility. A method for minimizing polarization-induced signal fading is also disclosed.

9 Claims, 11 Drawing Sheets

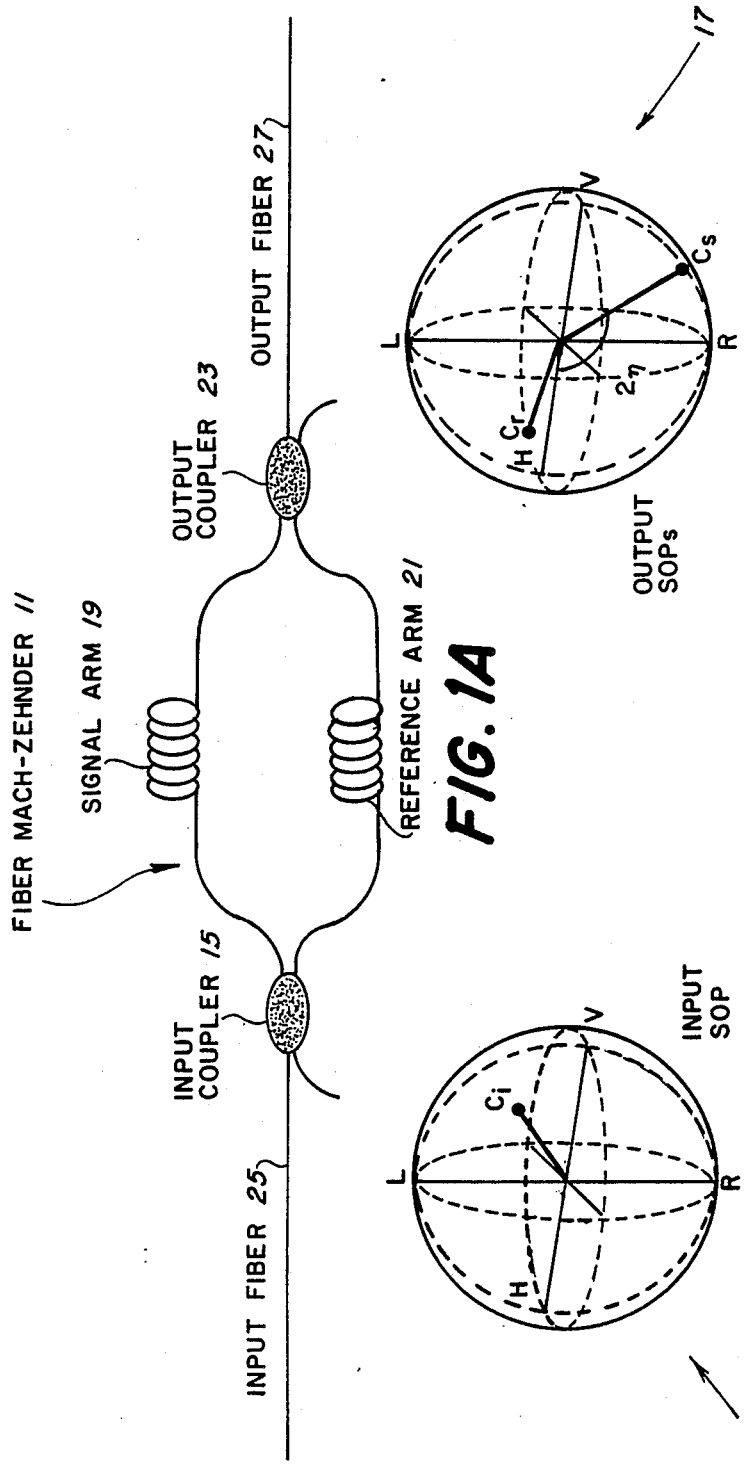

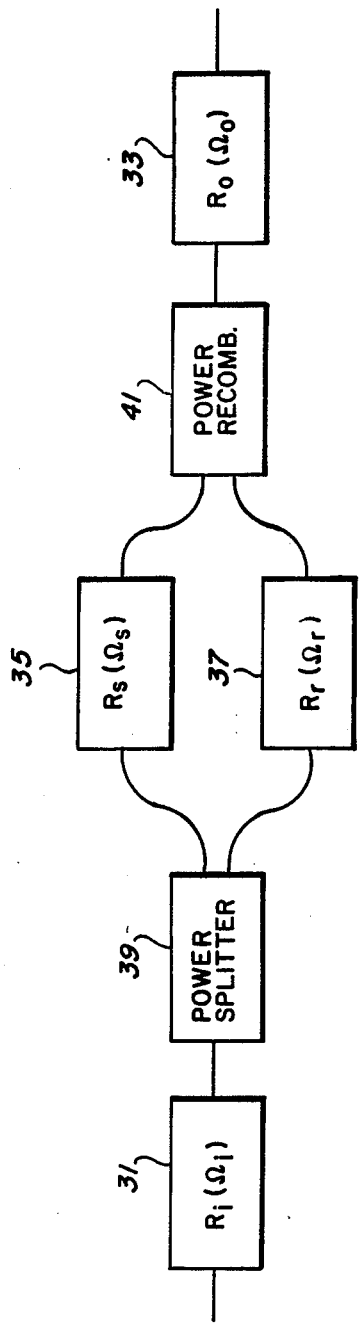
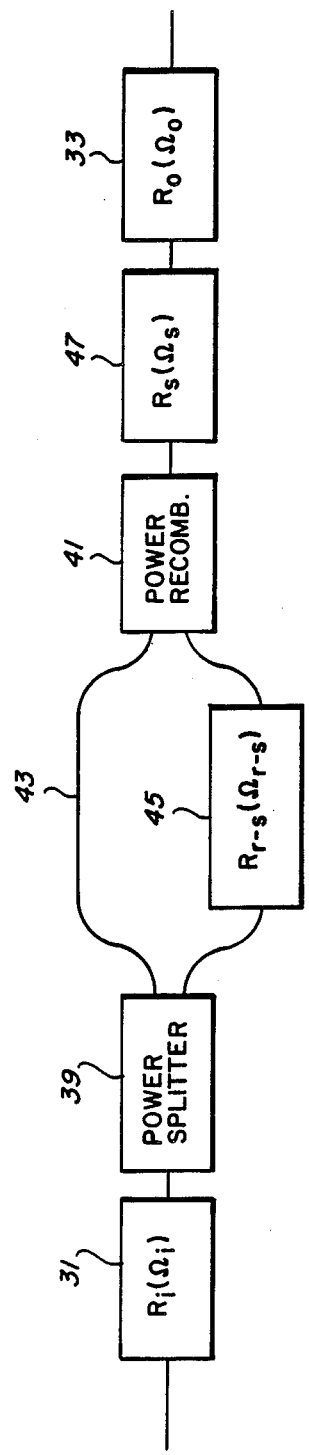

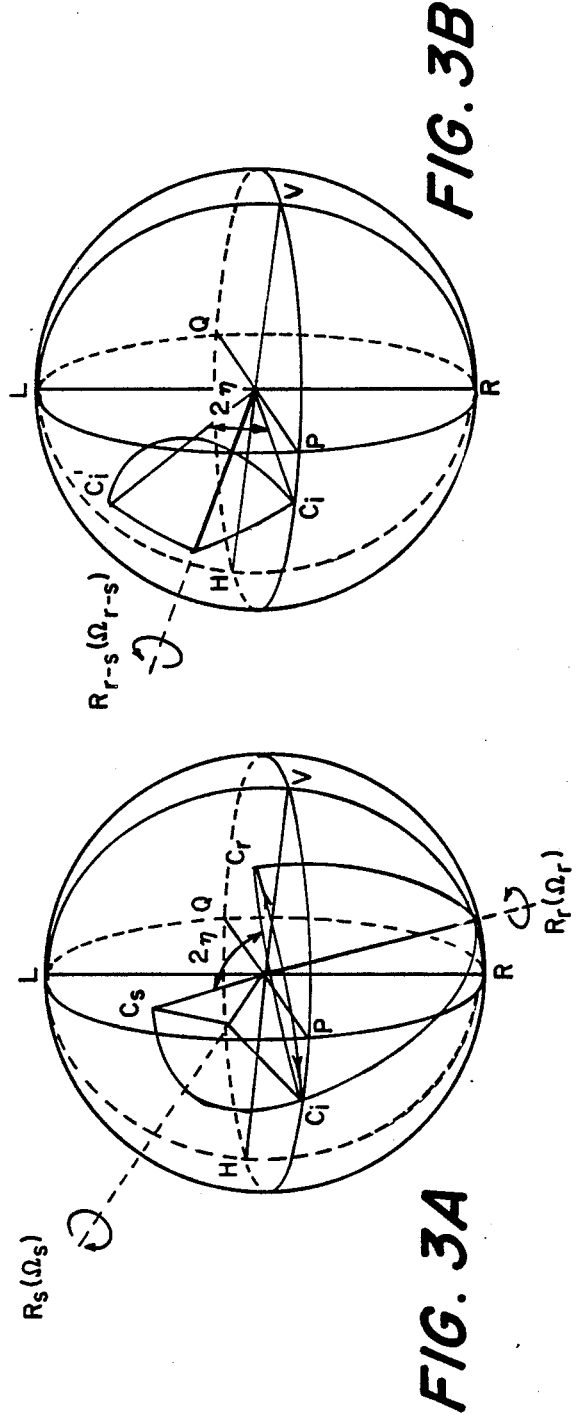
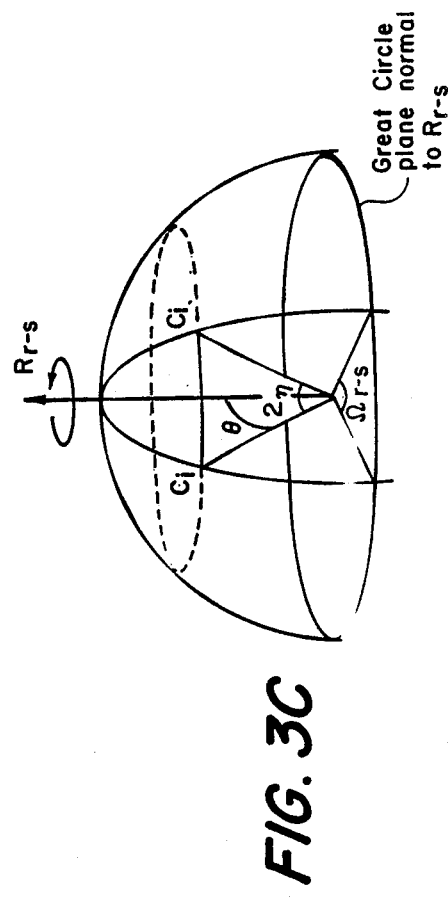
FIG. 3A
FIG. 3B
FIG. 3C

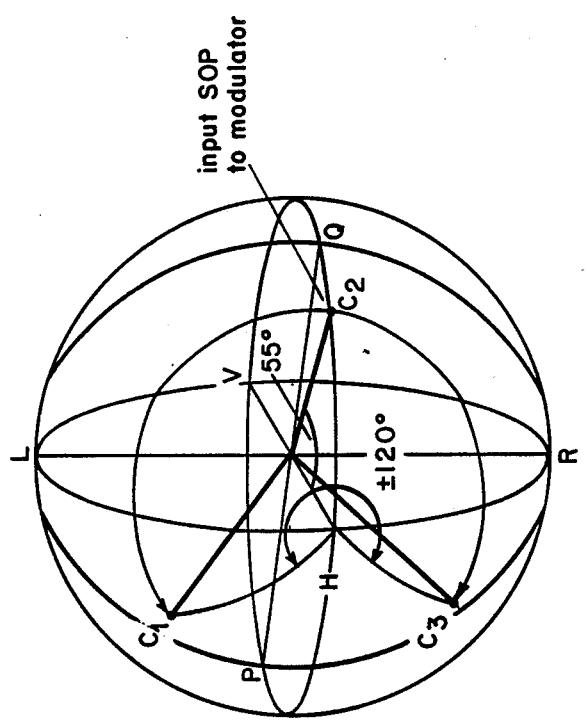
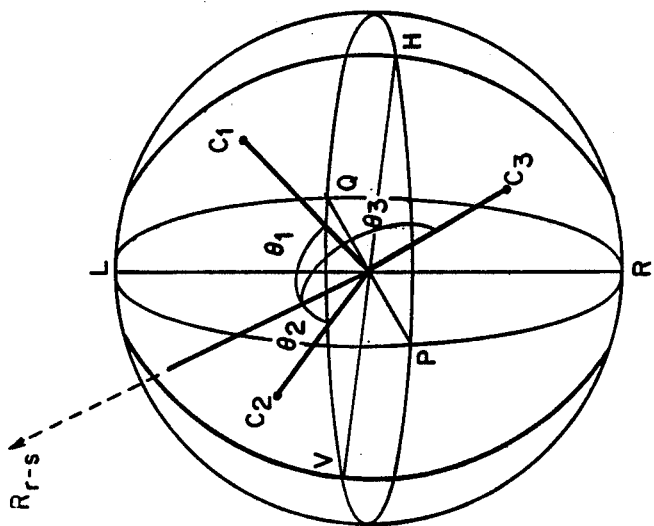
FIG. 4B
FIG. 4A

APPARATUS AND METHOD FOR MINIMIZING POLARIZATION-INDUCED SIGNAL FADING IN AN INTERFEROMETRIC FIBER-OPTIC SENSOR USING INPUT-POLARIZATION MODULATION

BACKGROUND OF THE INVENTION

1. Field of the Invention

The present invention relates to polarization-induced signal fading in interferometric fiber-optic sensors and particularly to an apparatus and method for minimizing such polarization-induced signal fading in an interferometric fiber-optic sensor by interrogating the sensor using an input polarization-modulated source. This allows the sensor output to be interrogated simultaneously at different input states of polarization (SOPs), or for the input polarization to be changed electronically by changing the point at which the output is sampled in relation to the input SOP modulation.

2. Background Description

In recent years interferometric fiber-optic sensors have been configured to detect a wide range of physical fields, such as acoustic waves and temperature fluctuations. These sensors typically operate with high sensitivity, good linearity, and over a wide dynamic range.

In operation, an interferometric fiber-optic sensor combines the light beams from two optical paths (through signal and reference arms) in the interferometer of the sensor and causes them to interfere to produce an interference pattern that is proportional to the field being sensed by the sensor. The interference between the light beams from the two paths can fade due to polarization drifts. If the states of polarizations of the two interfering beams from the two arms of the interferometer are co-directional, the interference is at a maximum and the sensitivity of the sensor is greatest. However, if the states of polarizations of the beams from the two arms are orthogonal to each other, the light from the two arms do not interfere and the sensitivity of the sensor is zero. Usually, conventional low-birefringence single-mode optical fiber is used to construct interferometric sensors of the Mach-Zehnder and Michelson types. As a result, random fluctuations in the state of polarization (SOP) of the interfering beams guided in the nominally circular fiber core can lead to fading of the interference signal. This phenomenon, termed polarization-induced (signal) fading' is well know. It should be noted at this time that polarization-induced signal fadding in interferometric fiber-optic sensors can occur due to two sources of polarization wandering- that in the actual arms of the sensor itself and that occurring in the input fiber to the sensor.

Several techniques have been proposed to overcome the effect of polarization-induced signal fading. These techniques range from the use of simple manual or automatic polarization controllers in the arms of the fiber interferometer, to techniques which can be described as polarization diversity detection schemes based on output polarization state selection.

In the case of manual or automatic polarization controllers, active polarization controllers, such as those based on fiber squeezers, Faraday rotators, or rotatable fiber wave plates developed for use in coherent communications systems, can be inserted into one or both of the fiber arms and used to match the SOP's of the interfering beams. This approach is well suited for use in laboratory sensor systems, but is not a practical solution for a prototype sensor, since such a sensor is usually required to operate passively and be remotely located from the source and detection/demodulation electronics.

In the case of polarization diversity detection, fading can be overcome by appropriately selecting a polarization mode at the output of the interferometer. This technique has been demonstrated using a passive three-axis polarizer mask at the interferometer output, and by effectively selecting the output polarization mode (general ellliptical) using a fixed output polarizer and active birefringence manipulation in the output fiber lead. This technique is demonstrated in U.S. Pat. No. 4,653,915 issued to Frigo et al. on Mar. 31, 1987.

Another technique is to construct the interferometer using high-birefringence (polarization preserving) fiber. However, due to the lack of high quality polarization preserving fiber components, notably directional couplers, this approach has met with little success. In a recent Patent Application, Ser. No. 07/301,301 filed on Jan. 25, 1989, titled "Apparatus And Method For Minimizing Polarization Induced Signal Fading In An Interferometer Fiber-Optic Sensor Using Input-Polarization Control" by A. D. Kersey, a method of overcoming signal fading through active feedback control of the input SOP is disclosed. The current invention discloses a novel technique for overcoming polarization induced signal fading based on an input-polarization diversity mode of operation.

SUMMARY OF THE INVENTION

Accordingly, it is a general object of this invention to minimize polarization-induced signal fading in a two-beam interferometric fiber optic sensor.

Another object of this invention to minimize polarization-induced signal fading in a two-beam fiber optic sensor utilizing an input polarization modulation technique.

A further object of this invention is to minimize polarization-induced signal fading in a multiplex interferometric fiber-optic sensor system where several sensors receive light from a single light source.

These and other objects of this invention are achieved by providing a method and an apparatus for minimizing polarization-induced signal fading in an interferometric fiber-optic sensor which utilizes input-polarization modulation technique. The apparatus includes an optical source for providing an input light beam to a polarization modulator which modulates the light beam such that it varies between at least three SOPs which can be described by mutually perpendicular polarization vectors on a Poincare Sphere. An interferometer is responsive to this modulated light beam and developes an interference output pattern. A photodetector developes an electrical signal at its output which is modulated due to the input polarization modulation. The resultant output is sampled to produce the outputs corresponding to the three chosen input SOPs, and from these three, the signal having maximum visibility is selected.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein:

FIGS. 1(a–c) illustrates a schematic of a Mach-Zehnder interferometer and the Poincare Sphere representations of the SOP's of the light at the first coupler ($C_i$), and in the signal ($C_s$) and reference ($C_r$) arms of the interferometer at the point of recombination in the output coupler;

FIG. 2a shows a birefringent network used to model the interferometer of FIG. 1;

FIG. 2b shows a second equivalent birefringent network which can be used to model the interferometer of FIG. 1;

FIGS. 3a, 3b and 3c illustrate Poincare Sphere representations of relevant SOP's and operators useful in understanding the operation of the birefringent networks of FIGS. 2A and 2B;

FIG. 4a illustrates three mutually perpendicular vectors on a Poincare sphere;

FIG. 4b illustrates SOP modulation trajectory on a Poincare sphere scanning three mutually perpendicular states;

FIGS. 7(d–f) illustrate waveforms showing variation in the three channels induced by adjustment of polarization controllers with a signal fade at two outputs simultaneously;

DETAILED DESCRIPTION OF THE PREFERRED EMBODIMENT

Figure 5A:
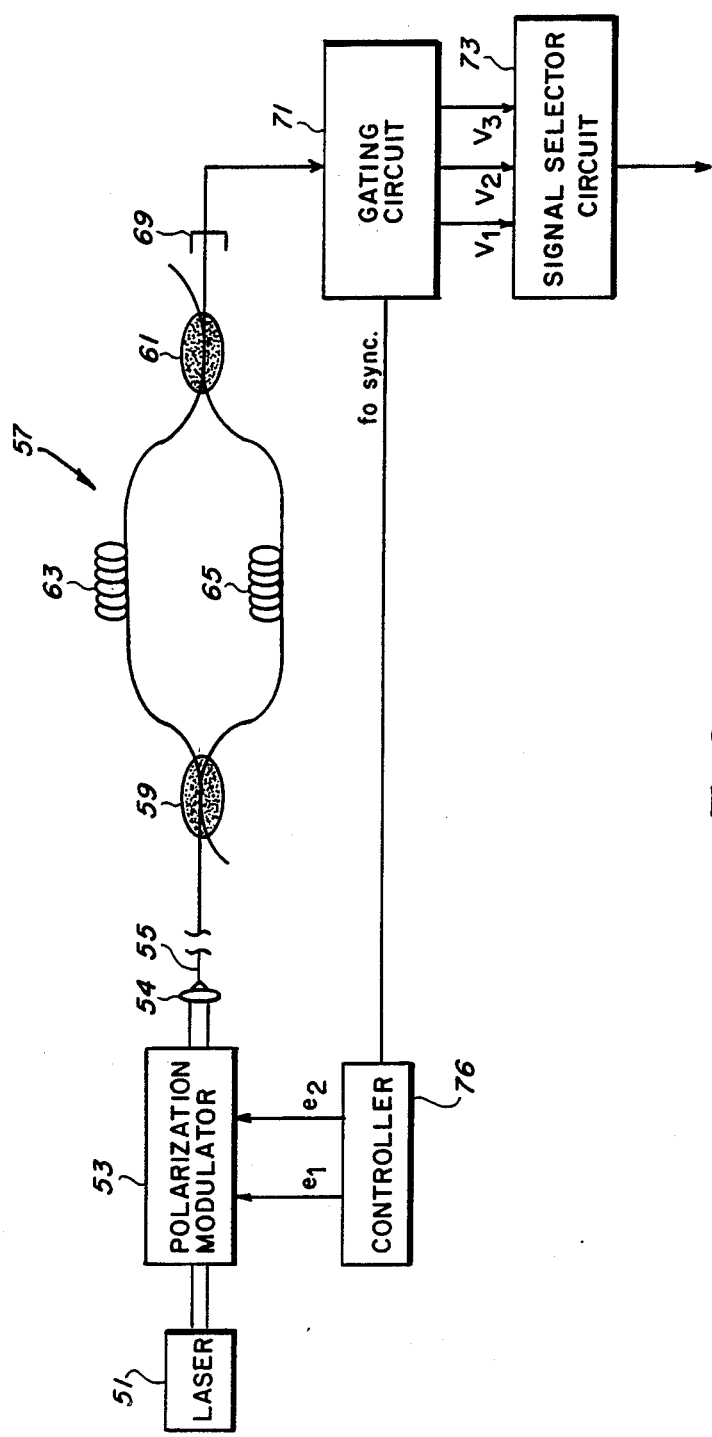
FIG. 5a illustrates a schematic block diagram of a first preferred embodiment of the invention.

Before the structure and operation of the invention are discussed, the polarization properties of two-beam interferometers will be analyzed to better understand the concepts involved in the invention. Although a Mach-Zehnder interferometer will be discussed specifically in this analysis, it should be understood that such analysis is equally applicable to other two-beam interferometers, such as a Michelson interferometer.

Referring now to the Figures, FIG. 1a illustrates a fiber Mach-Zehnder interferometer 11, having a Poincare Sphere representation 13 of the state of polarization or SOP (represented by $C_i$) of the light at an input coupler 15 as shown in FIG. 1b, and FIG. 1c illustrates a Poincare Sphere representation 17 of the SOP's (represented by $C_s$ and $C_r$) of the signal light from a signal arm 19 and the reference light from a reference arm 21 at the point of recombination in an output coupler 23.

In the operation of the Mach-Zehnder interferometer 11, input light having the $C_i$ SOP is propagated in an optical input fiber 25 to the input coupler 15, which splits the light into two light beams. One beam passes through the signal arm 19 to produce signal light having the SOP $C_s$ at the output coupler 23. This arm is subjected to an external field (e.g., acoustic, magnetic), which changes the phase of the beam as a function of the physical parameter or external field being sensed. The other beam passes through the reference arm 21, which is isolated from any external perturbations, to produce the reference light having the SOP $C_r$ at the output coupler 23. If the states of polarization ($C_s$ and $C_r$) of the signal and reference beams are not orthogonal to each other, they will interfere with each other to cause an optical interference pattern to be produced at the output of the coupler 23. This interference pattern is then propagated through an optical output fiber 27 for further processing.

Assuming polarization insensitive 1:1 coupling in each of the couplers 15 and 23, the fringe visibility (or depth of modulation of the interference maxima and minima) is simply given by $$V = \cos \eta \tag{1}$$

where $2\eta$ is the angle subtended by the great circle arc $C_s$–$C_r$ at the center of the Poincare Sphere. The coordinates of $C_s$ and $C_r$ depend on the net polarization evolution along the signal and reference arms 19 and 21 and the input SOP $C_i$. Consequently, the visibility is dependent on both $C_i$ (which in turn depends on the birefringence in the input fiber 25) and the net SOP evolutions of the signal and reference light in the interferometer 11 itself caused by birefringence in the two fiber arms 19 and 21.

It is well known that the net birefringence in a length of optical fiber can be described by means of a general elliptic retarder denoted by an operator $R_j$ of rotational magnitude (phase delay) $\Omega_j$; and expressed as $R_j(\Omega_j)$ on a Poincare Sphere.

FIG. 2A shows a birefringent network used to model the interferometric system of FIG. 1a. The birefringent network of FIG. 2A includes elliptic retarders 31, 33, 35 and 37 to respectively describe the net birefringence in the input and output fibers 25 and 27 and in the signal and reference arm fibers 19 and 21 of the interferometer 11 of FIG. 1a. The couplers 15 and 23 of FIG. 1a are modeled in FIG. 2A as ideal 1:1 power splitters 39 and 41, with power splitter 41 operating as a power recombiner. The birefringence effects of the power splitter 39 and power combiner 41 are lumped into the four primary operators shown in retarders 31, 33, 35 and 37. The net evolution of the input polarization state $C_i$, along the signal and reference arms (19 and 21 of FIG. 1a and 35 and 37 of FIG. 2A) is thus described by Poincare Sphere operators $R_s(\Omega_s)$ and $R_r(\Omega_r)$, respectively. In general, these operators are not equal (i.e. $R_2 \neq R_r$), and the input polarization state $C_i$ (13, FIG. 1b) is transformed into different output states $C_r$ and $C_s$ (17, FIG. 1c), as shown in FIG. 3A. It is important to note, however, that an input state $C_i$ coincident with the eigenmodes of $R_s$ or $R_r$ remains invariant in the net evolution of $C_i$ to $C_s$ or of $C_i$ to $C_r$, respectively (although not necessarily at all points along the signal or reference fibers).

FIG. 2B shows a second equivalent birefringent network which can be used to model the interferometric system of FIG. 1a. More specifically, FIG. 2B shows how FIB. 1a can be analyzed with just one birefringent operator representing the fiber arms. On the other hand, the birefringent network of FIG. 2A showed how to conventionally analyze FIG. 1a with a different birefringent operator representing each of the fiber signal and reference arms 19 and 21 of FIG. 1a.

In the birefringent network of FIG. 2B, the interferometer output at the point of the recombination of the signal and reference light (the output of the power recombiner 41) is viewed in a frame of reference rotated by $R_s^{-1}$. As a result, an additional elliptic retarder 47 must be inserted between the power recombiner 41 and the elliptic retarder 33. In this new frame of reference the signal arm 43 appears isotropic (where the net operator $R_s^{-1} \cdot R_s = 1$), whereas the reference arm operator 45 is $R_{r-s}(\Omega_{r-s}) = R_s^{-1} \cdot R_r$. This operator is a unique parameter of the interferometric system which essentially describes the 'differential-birefringence' between the fiber arms (19 and 21 of FIG. 1a), and can be used to analytically express the visibility of the interferometer 11 in terms of the input SOP $C_i$.

Referring now to FIGS. 3A, 3B and 3C, these figures illustrate Poincare Sphere representations of relevant SOP's and operators useful in understanding the operational concepts of the birefringent networks of FIGS. 2A and 2B. More specifically, FIG. 3A illustrates a Poincare Sphere representation of input and output SOP's for an arbitrarily chosen input SOP and elliptic retarders $R_r$ and $R_s$ in a fixed frame of reference (birefringent network of FIG. 2A). FIG. 3B illustrates a Poincare Sphere representation of input and output SOP's for an arbitrarily chosen input SOP and the differential elliptic retarder $R_{r-s}$ in the rotated output frame of reference. FIG. 3C more clearly illustrates the angular shift imparted in the input SOP ($C_i \rightarrow C_i'$) by the operator $R_{r-s}$.

Consider first the Poincare Sphere representation of the relevant SOP's and operators shown in FIGS. 3A and 3B. Operation on the input SOP $C_i$ by the operator $R_{r-s}(\Omega_{r-s})$ of FIG. 2B produces a polarization state $C_i'$, as shown in FIG. 3B. The relative separation of $C_i$ and $C_i'$ on the Poincare Sphere of FIG. 3B is identical to the relative separation between the SOP's $C_s$ and $C_r$ from the signal and reference arms (19 and 21 of FIG. 1) at the output of the interferometer (11) after separate operations by $R_s$ and $R_r$. These SOP's $C_s$ and $C_r$ are shown on the Poincare Sphere of FIG. 3A. The angular separation between two polarization states ($C_i$ and $C_i'$, or $C_s$ and $C_r$) is defined by the angle subtended at the center of the applicable Poincare Sphere by a great circle arc joining the two states. Thus it has been shown that the polarization dependence of an interferometer can be described by a single diffferential elliptical retarder $R_{r-s}(\Omega_{r-s})$ which is basically describes the difference in polarization properties of the two fiber arms.

Consequently, for an input polarization state coincident with the operator $R_{r-s}$, no angular shift will be imparted in $C_i$ and the output states $C_r$ and $C_s$ must be coincident, giving optimum visibility (i.e., unity for 1:1 power splitting in the couplers (15 and 23 of FIG. 1a or elements 39 and 41 in FIG. 2B)). Two input SOP's, one aligned with $R_{r-s}$ and the other diametrically opposite, thus exist which behave as eigenmodes of the interferometer for which optimum visibility can be achieved.

For an arbitrary input SOP, $C_i$, the visibility can be calculated by resolving the input state onto the two eigenmodes, and summing the output interference intensities (as the two output fringe components will be orthogonal polarizations, the total interference output is given simply by the scalar sum of the two intensities). If the input SOP subtends an angle $\theta$ to the eigenmode vector $R_{r-s}$, the two components comprising the output interference are given by $$I_a = (\tfrac{1}{2})I_0[\cos^2(\theta/2)\{1 + \cos(\phi + \Omega_{r-s}/2)\}] \quad (1a)$$

$$I_b = (\tfrac{1}{2})I_0[\sin^2(\theta/2)\{1 + \cos(\phi - \Omega_{r-s}/2)\}] \quad (1b)$$

where $\Omega_{r-s}$ is the rotation magnitude of $R_{r-s}$, and $\Omega$ is the mean relative phase difference between the fiber arms experienced by light in the two input eigenmodes of $R_{r-s}$. The total output interference intensity is thus $I = I_a + I_b$, which gives $$\begin{aligned} I &= (\tfrac{1}{2})I_0[1 + \cos(\phi)\cos(\Omega_{r-s}/2) - \cos(\theta)\sin(\phi)\sin(\Omega_{r-s}/2)] \\ &= (\tfrac{1}{2})I_0[1 + \{1 - \sin^2\theta \sin^2(\Omega_{r-s}/2)\}^{\frac{1}{2}}\cos(\phi - \gamma)]. \end{aligned} \quad (2)$$

where $\gamma$ is an interferometric phase offset term dependent on input SOP, which can give rise to an input polarization-induced phase-noise component. The visibility is given by the expression $$V = \{1 - \sin^2\theta \sin^2(\Omega_{r-s}/2)\}^{\frac{1}{2}} \quad (3)$$

Clearly, this equation shows that if $\Omega_{r-s} < \pi$ (modulo $2\pi$), then $V > 0$ for all input SOP's, i.e., the visibility varies between the limits $V_{max} = 1$ and $V_{min} = \cos(\Omega_{r-s}/2)$, which occur when $\theta = 0$ and $\theta = \pi/2$, respectively.

Due to the nature of the dependence of the visibility on input SOP defined by equation 3, the input SOP can always be switched between three states for which it is impossible to obtain $V_{min}$ simultaneously. Ideally, the three SOPs form a set which are represented by mutually perpendicular vectors on the Poincare sphere (not mutually orthogonal SOPs), as shown in FIG. 4a. Due to the relative positions of these SOPs, if any two SOPs fall on the great circle normal to the axis $R_{r-s}$ then the third must automatically be aligned with $R_{r-s}$, and thus provide optimum output visibility. Switching the input polarization between these three SOPs and sampling the output interference signal for each SOP allows three output interference signals to be electronically generated. In general, the three sampled outputs will have different interference visibilities, $V_1$, $V_2$, and $V_3$ of which the highest normalized visibility can be shown to range from approximately 0.6 to unity. Consequently, a strong non-zero interference amplitude is always present at least at one output, and complete signal fading can be overcome simply by selecting the appropriate output. Thus the major concept of this invention includes switching the input polarization between three SOPs which form a set of mutually perpendicular vectors on the Poincare Sphere, sampling the corresponding output interference signal for each of the three SOPs, and selecting the output interference signal with the highest normalized visibility.

Figure 5B:
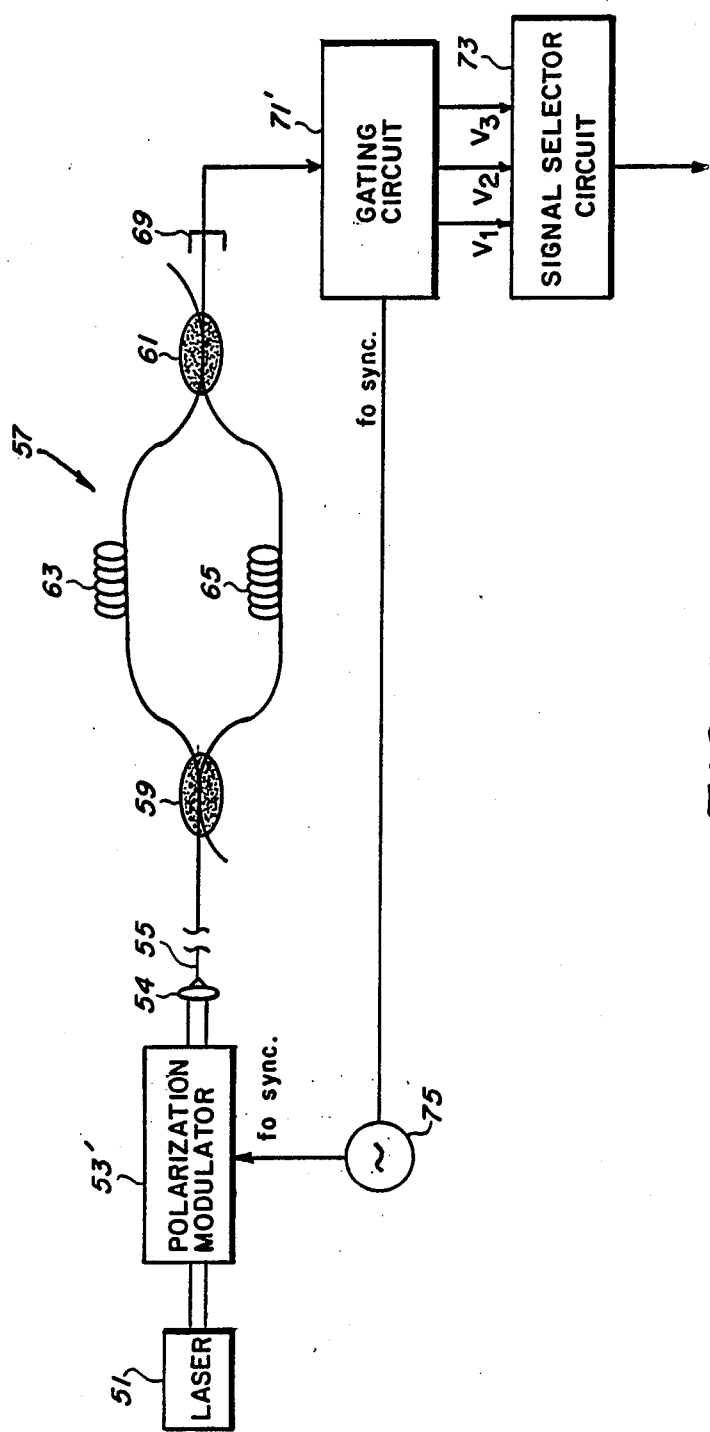
FIG. 5b illustrates a schematic block diagram of a second preferred embodiment of the invention.

Referring now to FIG. 5, a schematic block diagram of a first preferred embodiment of the invention will now be discussed, which implements the above-described concept.

A radiation source or laser 51 passes an input light beam through a polarization modulator 53, a focusing lens 54, and an input fiber 55 to an exemplary Mach-Zehnder interferometer 57. Although not shown, the radiation source 51 may include an isolator at its output to prevent light from being reflected back into the source 51. Polarization switching at the input to the interferometer necessitates the use of a high speed birefringent modulator. The polarization modulator 53 may be for example an Electro-optic guided-wave device for general polarization transformation as described by R. C. Alferness in IEEE J. Quant. Electron., 17 p.965, (1981). The Mach-Zehnder interferometer 57 includes input and output couplers 59 and 61 and signal and reference arms 53 and 56 which respectively correspond in structure and operation to the input and output couplers 15 and 23 and signal and reference arms 19 and 21 of the interferometer 11 of FIG. 1a.

The input light beam with the three SOPs is split by the input coupler 59 into the signal and reference arms 63 and 65, respectively, and then recombined in the output coupler 61 to form an optical interference pattern at the output of the coupler 61. This optical interference pattern is photodetected by a photodetector 69, which develops an electrical signal that has an amplitude proportional to the intensity of the optical interference pattern. The electrical signal is applied from photodetector 69 to gating circuit 71. The polarization transformer 53 receives two voltage control signals $e_1$ and $e_2$ from controller 76 which switch the polarization control elements. The Polarization transformer 53 and gating circuit 71 are synchronized to produce three interference signals with visibilities $V_1, V_2$, and $V_3$ (corresponding to the input SOPs $C_1$, $C_2$, and $C_3$), at the output of the gating circuit 71. Other more sophisticated methods of combining the outputs may be used to derive outputs which show little overall fading effects.

Figure 6A:
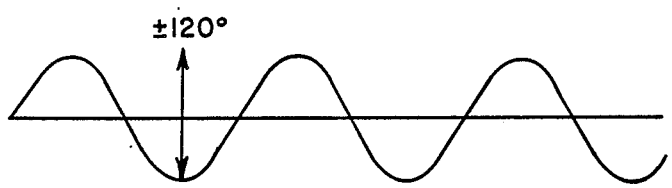
FIGS. 6(a–d) illustrate detector gating waveforms for three output channels in relation to Photo-elastic modulator of the input light source.
Figure 6B:
Figure 6C:
Figure 6D:
Figure 7C:
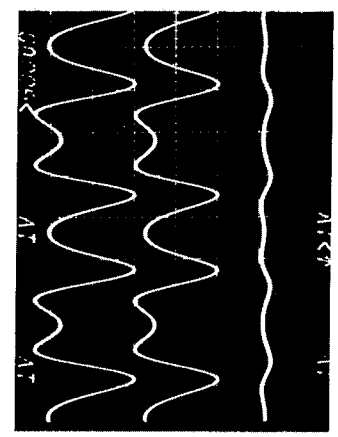
FIGS. 7(a–c) illustrate waveforms showing variation in the three channels induced by adjustment of polarization controllers with a signal fade at one output.
Figure 7B:
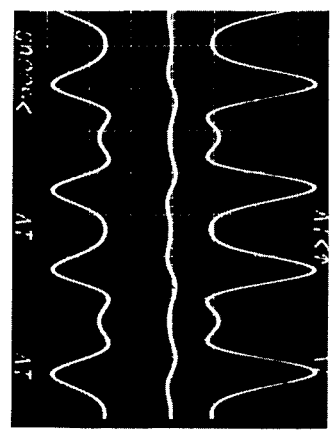
Figure 7A:
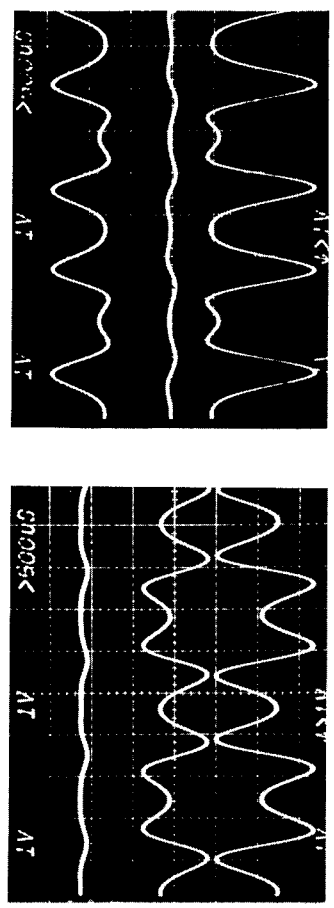
Figure 7F:
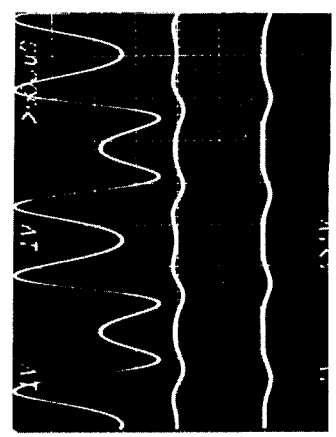
Figure 7E:
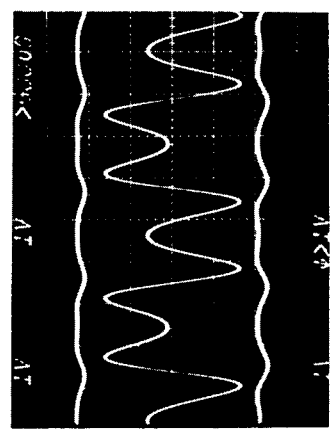
Figure 7D:
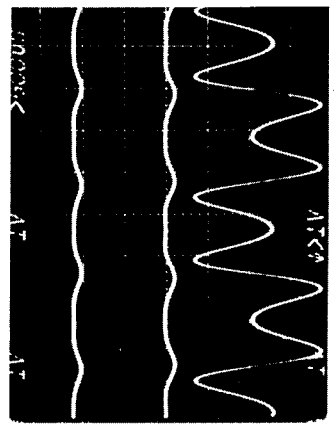

In a second embodiment, the input SOP is scanned about a minor circle, as shown in FIG. 4b, which passes through the three mutually perpendicular vectors shown in FIG. 4a. Thus, the output visibility cannot be zero for all input SOP of the modulation. FIG. 7 shows a schematic diagram of the arrangement used to implement this input-polarization sampling technique. In this embodiment, a sinusoidally modulated birefringent modulator, such as a PEM-80 manufactured by Hinds Inc., is used, which scans the input SOP through a sequence of SOPs which include the three desired SOPs $C_1$, $C_2$, and $C_3$. The resultant output from photodetector 69 is then time gated into three channels $V_1$, $V_2$, and $V_3$. To accomplish this, linearly polarized light from the source 51 is passed through the polarization modulator 53', which is oriented such that its axes are at an angle of 27.5°/62.5° to the plane of the input light, and driven at a peak polarization mode phase delay (retardance) $\Delta\psi$ of $\pm 120°$ ($\pm 2\lambda/3$). The frequency of the frequency generator 75 should be at least twice the frequency that the interferometric sensor is measuring or operating at. Using spherical geometry, it can be shown that with this relative orientation between the modulator axes and input polarization plane and modulation amplitude, the modulation in the SOP passed by the modulator can be described by a minor circle arc trajectory on the Poincare sphere as shown in FIG. 2b, which scans through three mutually perpendicular vectors at the peaks and zero-crossing of the modulation. The timing of the detector output gating is shown in the insert in FIG. 6. Here, FIG. 6a shows the polarization modulation waveform, and FIGS. 6(b-d) show the gating waveforms used to sample the detector output for the three channels. The SOP at the zero-crossing of the modulation, as shown in FIG. 6d is sampled at twice the rate of the peaks to reduce the averaging effects. The duty cycle for each channel is approximately 20%. Although not shown, the three interferometric outputs can then be filtered (LP<20 kHz) and output to the signal selector circuit 73.

Referring to FIGS. 7(a-c), there is shown an oscilloscope trace of the three separate channel outputs vs time. In the experimental setup to demonstrate the theory, a piezoelectric phase shifter was included in one arm of the Mach-Zehnder interferometer. It was modulated at an amplitude of $2\pi$ rad. p—p at approximately 300 Hz to display the interference amplitude in each output. With the PEM modulation amplitude set to zero, all three channels showed the same output visibility and faded in phase with variation of the input polarization controllers. FIG. 7 shows the variation in the three outputs observed with changes in the input polarization controllers (fiber and/or bulk controllers), when the modulator was driven at the required ±120° polarization phase delay amplitude. These oscilloscope photographs show the cases where in FIGS. 7(a-c), one channel and in FIGS. 7(d-f) two channels display a near zero V condition (signal fade). It should be noted that when two outputs displayed strong signal fading, the third showed close to optimum visibility (approximately 0.9). This shows that if a signal fade at two of the outputs occurs then the third one must be aligned with the eigenmode vector. Thus under any circumstances, a normalized visibility of at least 0.6 can be obtained. Fading of all three outputs simultaneously was not found to be possible, as theoretically predicted.

Figure 8:
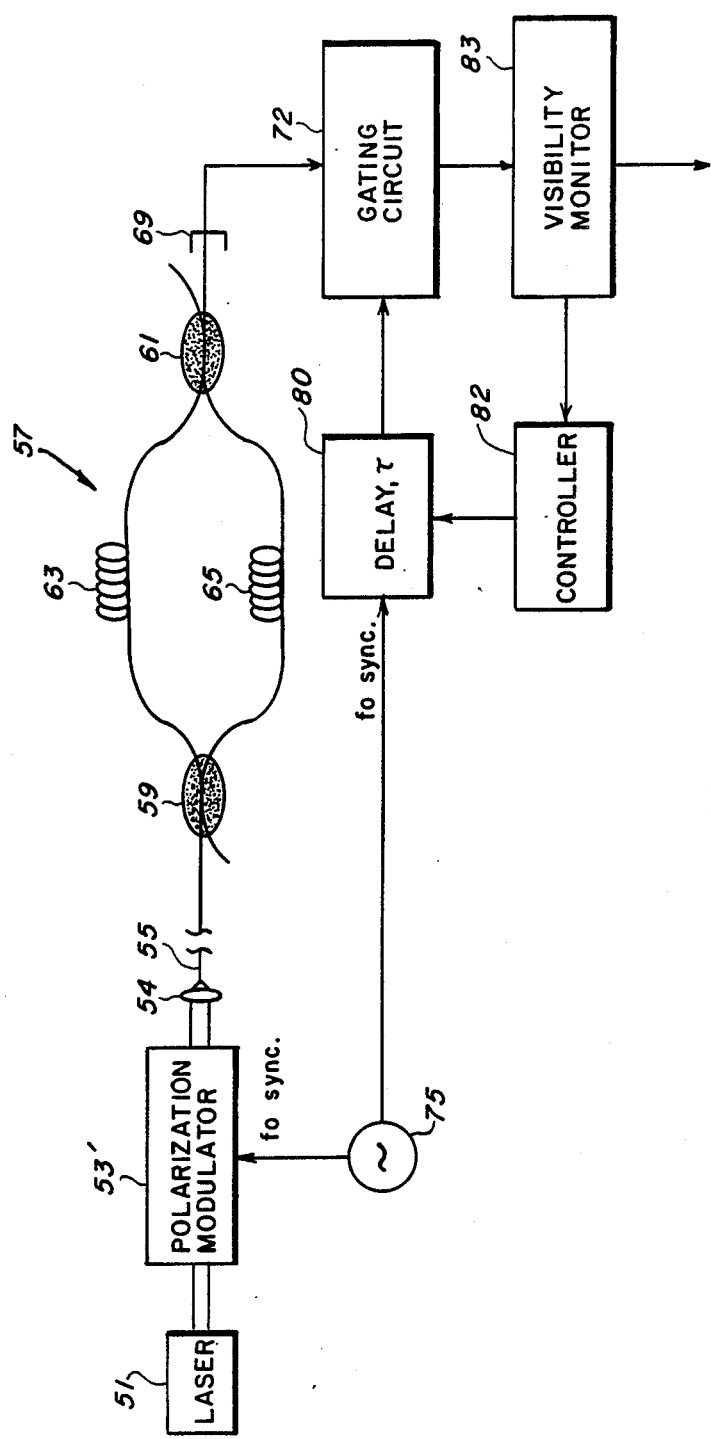
FIG. 8 illustrates a schematic block diagram of an alternate embodiment of the invention using a variable-time-sampling approach.
Figure 9:
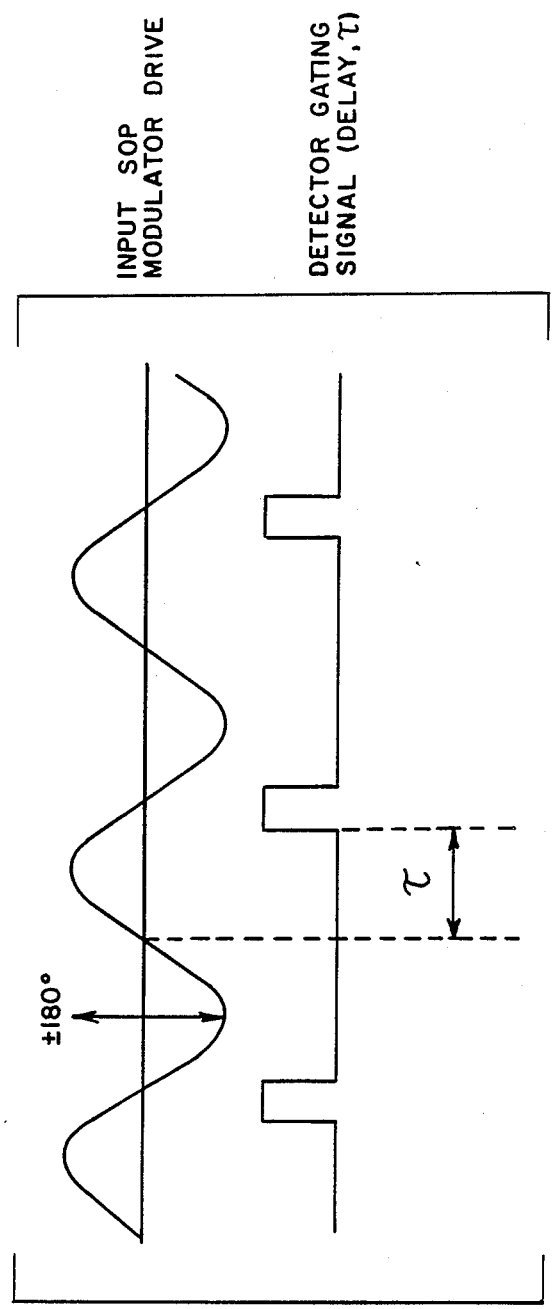
FIG. 9 illustrates a detector gating waveform for the variable-time sampling approach in relation to the Photo-Elastic Modulator waveform.
Figure 10:
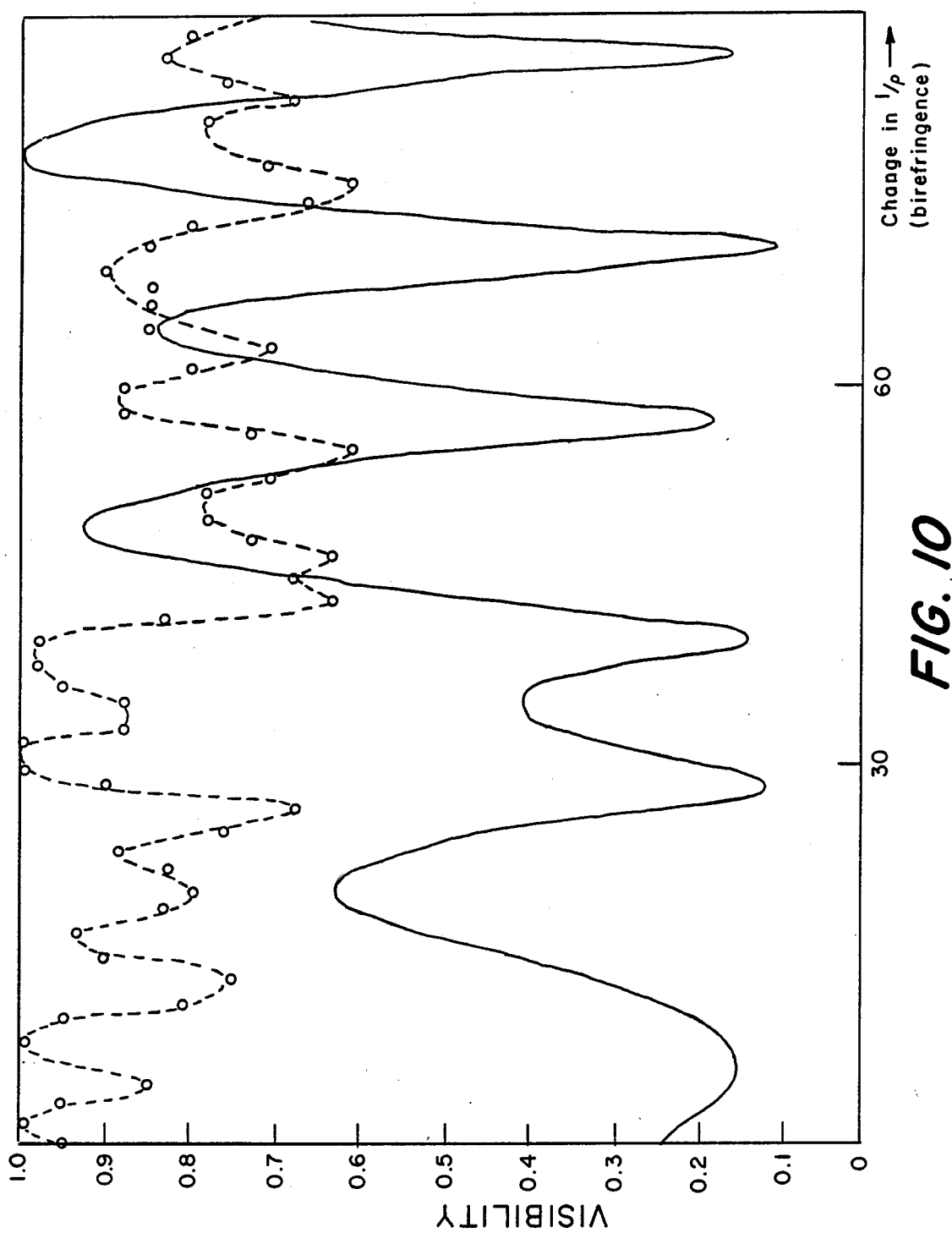
FIG. 10 is a graphic representation of the output signal visibility vs. birefringence for the system of FIG. 8 with and without compensation by variable-time-sampling.

In a third embodiment as shown in FIG. 8, the output from the detector 69 is time sampled synchronously with respect to the modulation but with a variable time delay $\tau$ relative to the zero-crossing of the SOP modulation, as shown in FIG. 9. The configuration of FIG. 8 is essentially the same as that of the second embodiment with the addition of a delay circuit 80 which is synchronized with the polarization modulator 53'(PEM). In addition, a gating circuit 72 has only one output. This allows the effective sampled input SOP to be changed 'electronically' by adjusting the time delay $\tau$ through delay circuit 80. The delay can be automatically adjusted by controller 82 until a visibility monitor 83 determines that a maximum visibility has been achieved. In this third embodiment a single interferometer output is generated by time sampling the interferometer output at a specific time during the input SOP modulation. This approach permits compensation for polarization induced signal fading to a degree equal to the three-input-SOP scheme described above in regard to the second embodiment. In an experimental setup the relative delay $\tau$ of the output gating (sampling) was manually varied, in order to obtain a maximum in the output fringe visibility while the birefringence properties of the input fiber, and reference and signal arm fibers of the interferometer were manually perturbed. The results shown in the upper (dotted line) plot of FIG. 10 demonstrate that an output fringe visibility greater than approximately 0.6 is always achievable using the variable-time-sampling scheme. In contrast, the lower (solid line) plot of FIG. 10 shows the result obtained without utilizing the time-sampling approach.

All the systems described above could be used in a multiplex sensor system where several sensors receive light from a single source of laser light and divide that light into the multiple sensors. Each of the sensors would have a separate eigen-vector ($R_{r-s}$) describing it, but it is not possible to align the input polarization vector with each of the separate vectors representing the separate sensors because they will be randomly distributed on the Poincare Sphere. Using the techniques described above, it is possible is possible to obtain a visibility of at least 0.6 for each of the separate sensor outputs.

Thus, an input-polarization-diversity technique for overcoming polarization induced signal fading in interferometric fiber sensors based on an input-polarization scanning technique is described. The scheme is capable of compensating for polarization-induced fading in interferometric systems arising due to both input-lead polarization-wandering and perturbations of the fiber arms of the interferometer itself by using a simple input-polarization modulation approach combined with output time-sampling. This sampling can be performed on a fixed-time basis, in which case three effective input SOPs are sampled, or in a variable-time sampling mode, in which case the effective input SOP is changed by varying the delay of the sampling gate relative to the input SOP modulation waveform. This later approach provides a simple 'electronic' compensation for polarization induced signal fading in interferometric fiber sensors.

Therefore, the apparatus and associated method for minimizing polarization-induced signal fading in an interferometric fiber-optic sensor modulates the state of polarization of the light input to the interferometric system to maintain the visibility at its maximum value.

It should therefore readily be understood that many modifications and variations of the present invention are possible within the purview of the claimed invention. It is therefore to be understood that within the scope of the appended claims, the invention may be practiced otherwise than as specifically described.

What is claimed and desired to be secured by Letters Patent of the United States is:

1. An apparatus for minimizing polarization-induced signal fading in an interferometric fiber-optic sensor, said apparatus comprising:
    an optical source for providing an input light beam;
    a polarization modulator for modulating the state of polarization of said input light beam into at least three states represented by mutually perpendicular polarization vectors on a Poincare Sphere;
    means for conveying said input light beam with the at least three mutually perpendicular modulated states of polarization to said interferometric fiber-optic sensor, said interferometric fiber-optic sensor being responsive to said input light beam with modulated polarization states for developing an interference pattern output, said interference pattern output having at least three visibilities corresponding to said input states of polarization;
    photodetection means responsive to said interference pattern output for developing an electrical photodetector signal having at least three amplitudes corresponding to the at least three input states of polarization; and
    output means responsive to said electrical photodetector signal for time-sampling the photodetector signal having three amplitudes corresponding to the at least three mutually perpendicular input states of polarization and selecting the one having maximum visibility.

2. The apparatus of claim 1 wherein said optical source is a laser.

3. The apparatus of claim 1 wherein said polarization modulator is an electro-optic guided-wave device for general polarization transformation, said device switches the input state of polarization between the three states of polarization represented by mutually perpendicular vectors on a Poincare Sphere.

4. The apparatus of claim 1 wherein said polarization modulator is a photo-elastic modulator which scans the input state of polarization about a minor circle which passes through the three mutually perpendicular vectors on a Poincare Sphere.

5. The apparatus of claim 1 wherein said conveying means is an optical fiber.

6. The apparatus of claim 3 wherein said output means comprises:
    a gating circuit for time-sampling the photodetector signal having the three visibilities corresponding to the at least three input states of polarization; and
    a signal selector means for comparing the three visibility signals and selecting the one having maximum visibility.

7. The apparatus of claim 4 wherein said output means comprises:
    a gating circuit for time-sampling the photodetector signal, on a fixed-time basis, whereby three effective input states of polarization are sampled; and
    a signal selector means for comparing the three signals and selecting the one having the maximum visibility.

8. The apparatus of claim 4 wherein said output means comprises:
    a gating circuit for time-sampling said photodetector signal, in a variable-time basis, whereby an effective input state of polarization is changed by varying the delay of the sampling gating circuit relative to the input state of polarization modulation waveform.

9. A method for minimizing polarization-induced signal fading in an interferometric fiber-optic sensor, said method comprising the steps of:
    modulating the state of polarization of an input light beam into at least three states of polarization represented by mutually perpendicular polarization vectors on a Poincare Sphere;
    conveying said input light beam to said interferometric fiber-optic sensor, whereby said sensor developes an interference pattern output signal having at least three polarization states;
    developing an electrical photodetector signal, in response to said interference pattern output, having at least three visibilities corresponding to said input states of polarization;
    time-sampling the photodetector signal having the three visibilities; and
    selecting the signal having maximum visibility.

* * * * *